(12) United States Patent
Hewitt et al.

(10) Patent No.: US 9,726,115 B1
(45) Date of Patent: Aug. 8, 2017

(54) SELECTABLE RAMJET PROPULSION SYSTEM

(75) Inventors: Patrick W. Hewitt, Broad Run, VA (US); Mark Mamula, Haymarket, VA (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 470 days.

(21) Appl. No.: 13/355,949

(22) Filed: Jan. 23, 2012

Related U.S. Application Data

(60) Provisional application No. 61/442,929, filed on Feb. 15, 2011.

(51) Int. Cl.
*F02K 9/28* (2006.01)
*F02K 7/18* (2006.01)
*F02K 9/26* (2006.01)

(52) U.S. Cl.
CPC .......... *F02K 9/28* (2013.01); *F02K 7/18* (2013.01); *F02K 9/26* (2013.01)

(58) Field of Classification Search
CPC ... F02K 9/70; F02K 9/72; F02K 9/763; F02K 9/36; F02K 9/24; F02K 9/26; F02K 9/28
USPC ............. 60/250–255, 219, 234, 224, 225
See application file for complete search history.

(56) References Cited

U.S. PATENT DOCUMENTS

| | | | |
|---|---|---|---|
| 2,987,875 A * | 6/1961 | Fox | 60/245 |
| 3,487,643 A * | 1/1970 | Colombani | 60/225 |
| 4,028,886 A * | 6/1977 | Hackett | 60/245 |
| 4,327,886 A * | 5/1982 | Bell et al. | 244/3.29 |
| 4,441,312 A | 4/1984 | Smith | |
| 4,651,523 A * | 3/1987 | Adams | 60/245 |
| 5,152,136 A | 10/1992 | Chew et al. | |
| 5,172,547 A * | 12/1992 | Lawrence et al. | 60/234 |
| 5,608,182 A | 3/1997 | Thompson et al. | |
| 6,258,188 B1 | 7/2001 | Hatcher et al. | |
| 6,412,275 B1 * | 7/2002 | Perrucci | 60/204 |
| 6,786,040 B2 | 9/2004 | Boehnlein et al. | |
| 7,794,665 B2 | 9/2010 | Weng | |
| 7,797,943 B2 | 9/2010 | Bulman | |
| 7,886,516 B2 | 2/2011 | Bulman | |
| 8,056,319 B2 | 11/2011 | Bulman et al. | |
| 2009/0205311 A1 * | 8/2009 | Bulman | F02K 7/10 60/219 |
| 2009/0211258 A1 | 8/2009 | Bulman | |
| 2011/0167794 A1 * | 7/2011 | Spear et al. | 60/254 |

* cited by examiner

*Primary Examiner* — Pascal M Bui Pho
*Assistant Examiner* — Marc Amar
(74) *Attorney, Agent, or Firm* — Joel G Landau

(57) ABSTRACT

A selectable ramjet propulsion system for propelling a rocket or missile includes a gas generator adjacent a booster. A frangible diaphragm is disposed between the gas generator and the booster. The booster and fuel gas generator can be operated in normal sequence, or operated at the same time in order to increase the thrust produced for short-range missions. A logic circuit contained on the rocket or missile determines a time to rupture the frangible diaphragm based on whether or not the distance to the target exceeds a threshold distance.

5 Claims, 4 Drawing Sheets

SELECTABLE RAMJET PROPULSION SYSTEM

CROSS REFERENCE TO RELATED APPLICATION(S)

This patent application claims a benefit to the filing date of U.S. Provisional Patent Application Ser. No. 61/442,929, titled "Selectable Ramjet Propulsion System," that was filed on Feb. 15, 2011. The disclosure of Ser. No. 61/442,929 is incorporated by reference herein in its entirety.

U.S. GOVERNMENT RIGHTS

N.A.

BACKGROUND

Field

The disclosure relates to a propulsion system for a missile. More particularly, applying at least a portion of ramjet impulse during the booster phase improves performance for short range missions.

Description of the Related Art

A ramjet missile requires a conventional rocket boost phase to reach high supersonic speeds, after which the ramjet can operate as designed. The specific impulse, or fuel consumption, of the ramjet phase is 3 to 4 times more efficient than the rocket phase, but the ramjet phase delivers a lower thrust level over an extended period. Because of this, at short launch ranges, the rocket is able to accelerate and intercept a target in less time than the boosted ramjet. For longer range intercepts, the ramjet is able to propel the missile much greater distances.

U.S. Pat. No. 8,056,319 B2, titled "Combined Cycle Missile Engine System," is assigned to the same assignee as the present patent application. The patent discloses a ducted rocket, also called an air augmented rocket, using the airflow induced into the engine to produce more thrust (augmentation) than would be produced by the rocket alone. Augmentation is low until a flight speed of Mach 1.5 is exceeded. This is due to low ram pressure at low supersonic speeds. Above Mach 1.5, the augmentation rises rapidly and can be in excess of 100%, twice the rocket only thrust. The disclosure of U.S. Pat. No. 8,056,319 B2 is incorporated by reference herein in its entirety.

BRIEF SUMMARY

One embodiment of the disclosure discloses a selectable ramjet propulsion system for propelling a rocket or missile. This system includes a gas generator adjacent a booster. A frangible diaphragm is disposed between the gas generator and the booster. A booster propellant contained within the booster is ignited and a distance to an intended target is determined. A logic circuit contained on the rocket or missile then determines a time to initiate the gas generator fuel supply and rupture the frangible diaphragm based on whether or not the distance to the target exceeds a threshold distance.

It is a feature of certain embodiments that this system allows an engine to burn ramjet fuel and booster propellant when a target is present at short range (less than the threshold distance). This enables the boosted ramjet engine to approach rocket only propulsion performance when long range capabilities are not needed.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

Like reference numbers and designations in the various drawings indicated like elements.

DETAILED DESCRIPTION

Propulsion phases of a missile mission include:

Boost phase occurs when a solid rocket is typically used to accelerate the vehicle to low supersonic speeds where the ramjet engine becomes efficient;

Transition phase occurs when the vehicle configuration is changed to allow air to enter the combustion chamber, and the fuel and air combustion process is initiated; and Ramjet sustain phase in which thrust is produced by sustained combustion of the fuel/air mixture.

Figure 1:
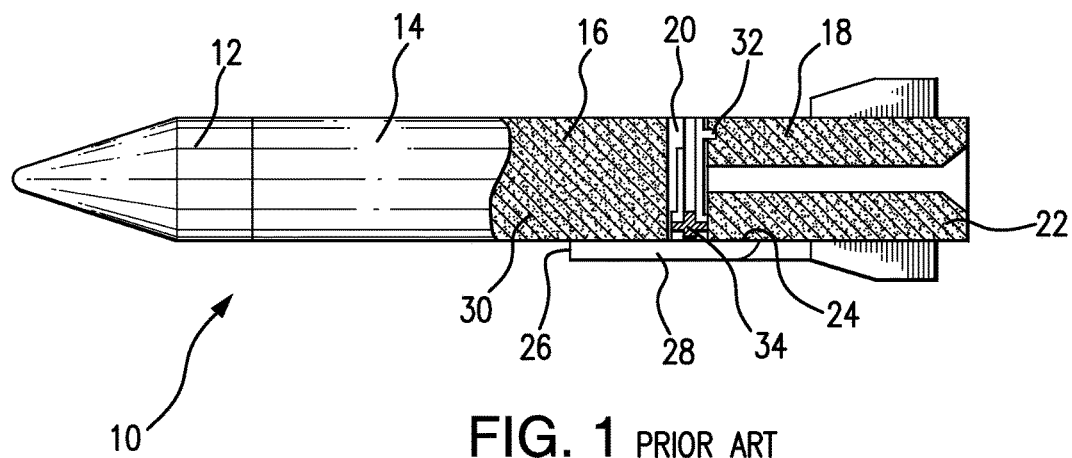
FIG. 1 illustrates a variable flow ducted rocket as known from the prior art.

FIG. 1 illustrates a variable flow ducted rocket 10 as known from the prior art. The rocket 10 includes a nose cone 12, warhead 14, gas generator 16 and combustor 18. Nose cone 12 typically includes a guidance system and other electronics. Disposed between the gas generator 16 and the combustor 18 is a fuel control valve 20. During the boost phase, combustor 18 is filled with a propellant 22 and functions as a nozzled or nozzleless booster operating at high pressure (nominally 2000 psia). At propellant 22 burnout, internal port cover 24 and external port cover 26 are opened to allow inlet airflow through the duct 28. For the ramjet sustain phase, the gas generator 16 is ignited to produce ramjet fuel. The gas generator propellant 30 is typically an end-burning grain. The gaseous product of the gas generator exits via a choked exit 32 with valve 34 controlling the operating pressure and amount of fuel produced. A typical gas generator 16 operating range is 200 psia-2000 psia. A typical combustor 18 operating range is 112 psia-200 psia, dependent on flight altitude and Mach number.

Figure 2:
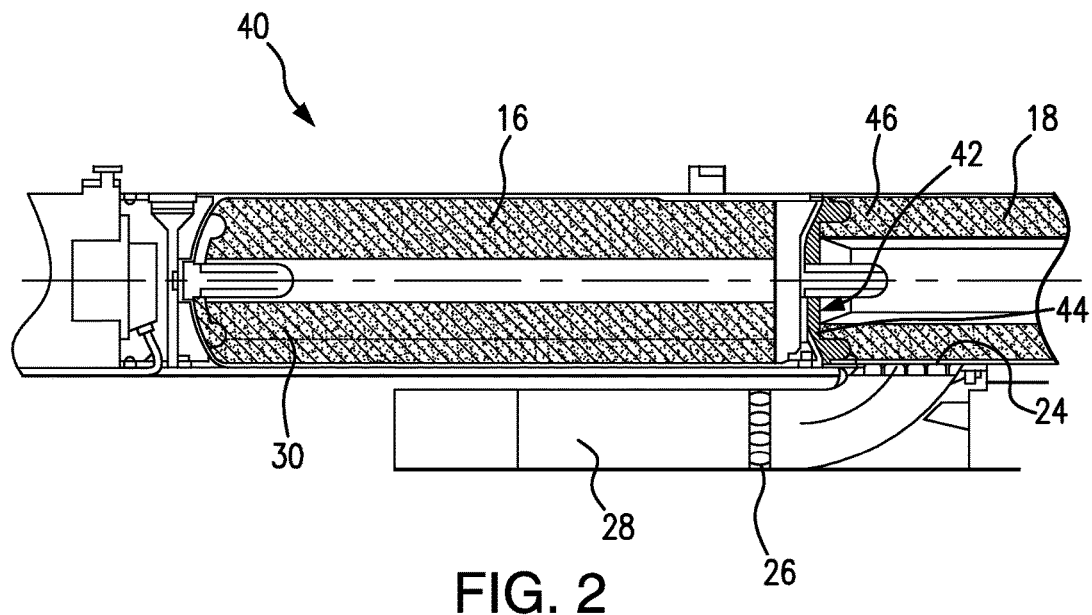
FIG. 2 illustrates an unchoked ducted rocket in accordance with an embodiment disclosed herein.

FIG. 2 illustrates a portion of an unchoked ducted rocket 40. Those portions not illustrated or described herein are similar to the prior art rocket 10 of FIG. 1. While described in terms of a rocket, all embodiments apply equally well to missiles. Referring back to FIG. 2, as in the prior art described above, a nozzled or nozzleless booster 18 operates at high pressure (2000 psia). At burnout, internal 24 and external 26 port covers are opened to allow inlet airflow through the duct 28. In the ramjet sustain phase, the gas generator 16 is ignited to produce ramjet fuel, a frangible diaphragm 42 is ruptured, and the gas generator 16 operates at low pressure with the exit 44 unchoked. An exemplary diaphragm is constructed to withstand the boost pressure in one direction, yet yield when pressure is introduced from the gas generator side. For an unchoked gas generator the diaphragm is sized to be large enough to allow subsonic flow at the gas generator exit. The gaseous product of the gas generator propellant 30 communicates with the combustor 18 (12 psia-2000 psia) and adapts to changing flight conditions. A center-perforated grain 46 is used to increase burning surface area and mass flowrate since the propellant burning rate in the combustor 18 is low at low pressure. An exemplary center-perforated grain has a composition of binder, oxidizer, and fuel as established in the prior art, and is sized to maximize fuel loading, yet conform to structural and ballistic requirements. The combustor pressure (a function of Mach number, altitude and flight angle) dictates gas generator pressure and fuel flowrate produced—thereby achieving passive flow control. The missile/engine operates in stable equilibrium at a given Mach number as a function of altitude.

Figure 3:
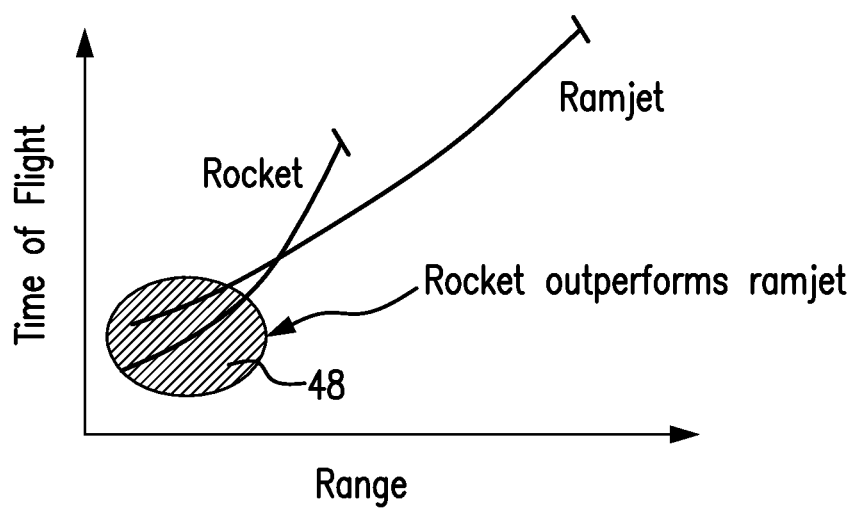
FIG. 3 graphically compares ramjet to rocket performance as functions of time of flight and range.

FIG. 3 graphically compares ramjet to rocket performance as functions of time of flight and range. Because the booster only operates up to a relatively low Mach number required to start the ramjet, and then ramjet thrust is at a much lower level, the ramjet time-to-target typically suffers for inner boundary 48 relative to the solid rocket.

Disclosed herein is a method whereby all or part of the ramjet impulse is applied to the boost phase on command to improve inner boundary performance when desired for a short range mission. This embodiment uses the unchoked ducted rocket engine shown in FIG. 2. It can be operated as a ramjet as described above. However, if it is being employed against a short range target and more boost impulse is desired, both the booster 18 and the gas generator 16 can be operated simultaneously to produce more thrust. In this case, the gas generator 16 is ignited first, which ruptures the diaphragm 42 and ignites the booster propellant 46. The gas generator propellant 30 and the booster propellant 46 then burn simultaneously. Due to the high gas generator surface area, the mass flow at the booster pressure is much greater than for typical end-burning grain design. At the transition to ramjet sustain, a portion of the ramjet fuel is already consumed, but the missile will be at a higher Mach number. Less fuel will remain for sustain operation, so this mode would only be employed where the long range capabilities of the ramjet are not needed.

As particularly illustrated in Example 2 below, there is a threshold distance to target beyond which the boost/ramjet mode is superior to the selectable ramjet propulsion system described herein. Preferably, the missile autopilot has access to range information prior to launch and employs logic to select one mode or the other without any input required from the pilot.

Advantages and Disadvantages of this Embodiment are:
Advantages:
Ramjet booster can be sized for takeover only, not increased to improve inner boundary. Increased thrust when desired for short range.
Improved ramjet thrust and Mach number, but less fuel remaining at takeover.
Disadvantages:
Fuel rich exhaust when burning simultaneously, potentially with accompanying unburned carbon.
Nozzle sizing and MEOP (maximum expected operating pressure) driven by simultaneous operation. This may result in non-optimum nozzled booster (nozzleless booster may not be affected).

The benefits of the preceding embodiments will be more apparent from the Examples that follow.

EXAMPLES

Example 1

Figure 4:
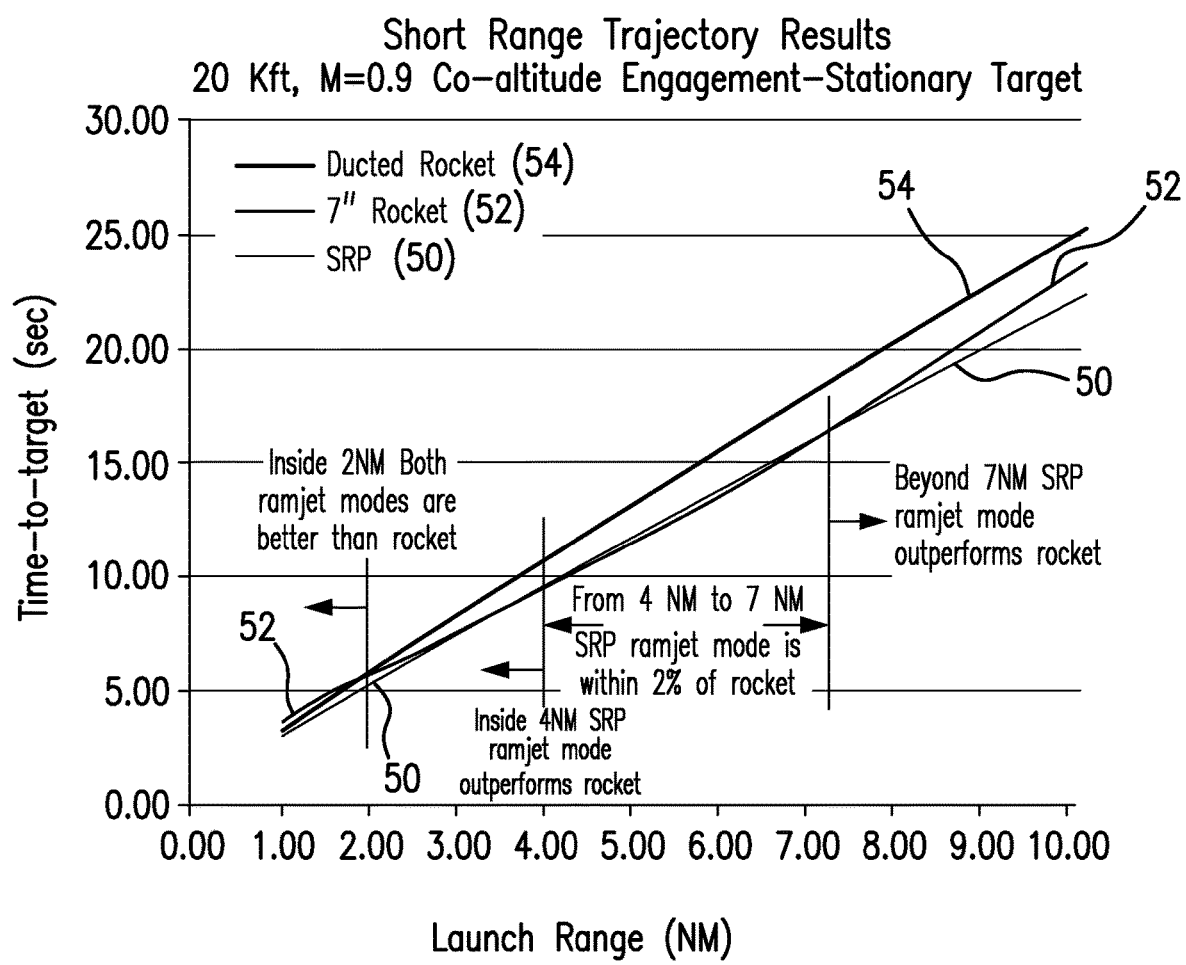
FIG. 4 graphically compares the performance of the selectable ramjet propulsion system described herein to rocket propulsion system over a launch range of from 1 to 10 nautical miles.

FIG. 4 graphically compares the performance of the selectable ramjet propulsion system (reference line 50) described herein to rocket propulsion (reference line 52) over a launch range of from 1 to 10 nautical miles. This is a computer simulation of an air-to-air engagement. When the enhanced selectable ramjet propulsion boost mode is used, the time to target is better than a comparable rocket within 2 nautical miles. From 4 nautical miles to 7 nautical miles, the selectable ramjet propulsion is within 2% of the rocket time. Beyond 7 nautical miles, the selectable ramjet propulsion is superior to the rocket. The ducted rocket line (reference line 54) represents the time to target for a conventional boost to ramjet operation (conserving all the ramjet fuel).

Example 2

Figure 5:
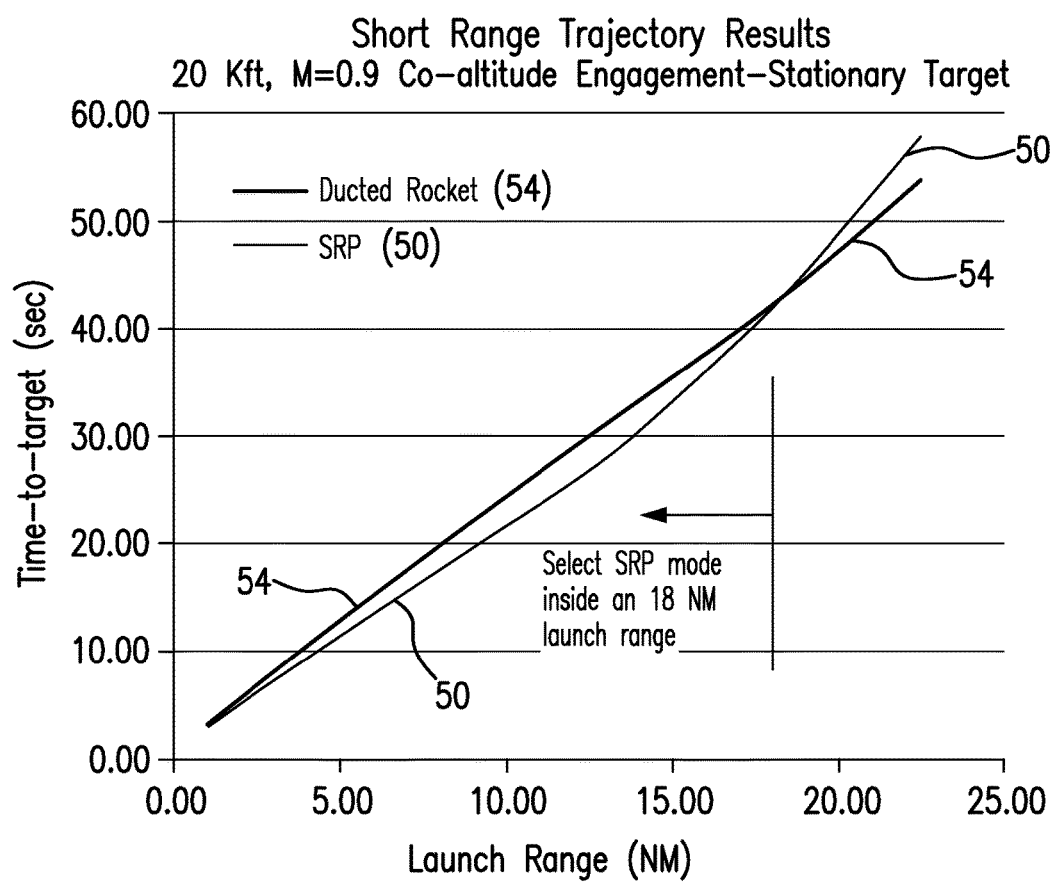
FIG. 5 graphically compares the performance of the selectable ramjet propulsion system described herein to the boost/ramjet propulsion system over a launch range of from 1 to 25 nautical miles.

FIG. 5 graphically compares the performance of the selectable ramjet propulsion system (reference line 50) described herein to the boost/ramjet mode of propulsion (reference line 54) over a launch range of from 1 to 25 nautical miles. The selectable ramjet propulsion mode results in short time to target inside a launch range of 18 nautical miles. For a range in excess of 18 nautical miles, the boost/ramjet mode results in a shorter time to target.

One or more embodiments of the present invention have been described. Nevertheless, it will be understood that various modifications may be made without departing from the spirit and scope of the invention. For example, an end-burning gas generator configuration could be employed in the selectable manner, and still demonstrate a degree of thrust increase. Accordingly, other embodiments are within the scope of the following claims.

What is claimed is:

1. A selectable ramjet propulsion system for propelling a missile, comprising: a variable flow ducted rocket having a gas generator, a combustor, a frangible diaphragm, and an inlet duct, wherein the a gas generator has a center-foforated grain solid rocket propellant, wherein the center-perforated grain solid rocket propellant of the gas generator is a ramjet fuel, wherein the gas generator is adjacent the combustor, wherein the combustor has a center-perforated grain solid rocket propellant, wherein the frangible diaphragm is disposed between said gas generator and said combustor, wherein the frangible diaphragm is configured to withstand an approximate 2000 psia boost pressure from the combustor, yet to yield upon a pressure lower than the boost pressure from the gas generator prior to an ignition of the center-perforated grain solid rocket propellant of the combustor, wherein the inlet duct is selectively fluidly coupled to the combustor via a port cover, and wherein the surface area of the frangible diaphragm is sized to allow an unchoked subsonic flow of a gaseous product of a combustion of the gas generator center-perforated grain solid rocket propellant into the combustor.

2. A method for operating a selectable ramjet propulsion system, for propelling a missile, having a gas generator adjacent a combustor of a booster and a frangible diaphragm disposed between said gas generator and said booster combustor, comprising the steps of: igniting a booster combustor propellant contained within said booster; determining a distance to an intended target; and determining a time to ignite the gas generator fuel and rupture said frangible diaphragm based on said distance to target, and wherein the selectable ramjet propulsion system comprises: a variable flow ducted rocket having the gas generator, the booster combustor, the frangible diaphragm, and an inlet duct, wherein the gas generator fuel is a center-perforated grain solid rocket propellant, wherein the center-perforated grain solid rocket propellant of the gas generator is a ramjet fuel, wherein the booster combustor propellant is a center-perforated grain solid rocket propellant, wherein the frangible diaphragm is configured to withstand an approximate 2000 psia boost pressure from the booster combustor, yet to yield upon a pressure lower than the boost pressure from the gas generator prior to an ignition of the center-perforated grain solid rocket propellant of the booster combustor, wherein the inlet duct is selectively fluidly coupled to the booster combustor via a port cover, and wherein the surface area of the frangible diaphragm is sized to allow an unchoked subsonic flow of a gaseous product of a combustion of the gas generator center-perforated grain solid rocket propellant into the booster combustor.

3. The method of claim 2 wherein said gas generator is activated and said frangible diaphragm is ruptured prior to consumption of said booster combustor propellant if said distance to an intended target is less than a threshold distance.

4. The method of claim 3 wherein said gas generator is activated and said frangible diaphragm is ruptured prior to ignition of said booster combustor propellant.

5. The method of claim 2 wherein said gas generator is activated and said frangible diaphragm is ruptured subsequent to consumption of said booster combustor propellant if said distance to an intended target exceeds a threshold distance.

* * * * *